United States Patent
Damon et al.

(10) Patent No.: US 8,805,611 B2
(45) Date of Patent: Aug. 12, 2014

(54) NEUTRAL ZONES FOR NAVIGATION

(75) Inventors: Todd E. Damon, Phoenix, AZ (US); Mathew Cucuzella, Phoenix, AZ (US)

(73) Assignee: General Motors LLC, Detroit, MI (US)

( * ) Notice: Subject to any disclaimer, the term of this patent is extended or adjusted under 35 U.S.C. 154(b) by 154 days.

(21) Appl. No.: 13/154,591

(22) Filed: Jun. 7, 2011

(65) Prior Publication Data
US 2012/0316770 A1    Dec. 13, 2012

(51) Int. Cl.
*G01C 21/00* (2006.01)

(52) U.S. Cl.
USPC ............... 701/412; 701/417; 701/466

(58) Field of Classification Search
USPC ............ 701/412, 417, 442, 446, 456
See application file for complete search history.

(56) References Cited

U.S. PATENT DOCUMENTS

| | | | |
|---|---|---|---|
| 2007/0276596 A1* | 11/2007 | Solomon et al. | 701/211 |
| 2008/0208445 A1* | 8/2008 | Bolton et al. | 701/201 |
| 2010/0045519 A1* | 2/2010 | Lee | 342/357.09 |
| 2011/0063138 A1* | 3/2011 | Berkobin et al. | 340/988 |
| 2012/0029805 A1* | 2/2012 | Schunder et al. | 701/201 |
| 2012/0179315 A1* | 7/2012 | Tate et al. | 701/22 |
| 2012/0303262 A1* | 11/2012 | Alam et al. | 701/410 |
| 2012/0303270 A1* | 11/2012 | Su et al. | 701/431 |

* cited by examiner

*Primary Examiner* — Khoi Tran
*Assistant Examiner* — Ryan Rink
(74) *Attorney, Agent, or Firm* — Leydig, Voit & Mayer, Ltd

(57) ABSTRACT

The described method and system provide for treatment of certain areas as neutral zones during GPS navigation to avoid unnecessary off-route notifications and route recalculation. A GPS unit determines whether the user has entered a geographic region designated as a neutral zone, and does not provide the user with off-route notifications while the user is within the neutral zone. Not providing off-route notifications may be implemented by the GPS device by considering the user to be within the calculated route while the user is within a neutral zone, or by disabling off-route notifications (and route recalculation) while the user is within the neutral zone. The neutral zone may be defined by a set of GPS coordinates. The neutral zone may further be polygonal, and the size of the neutral zone may be based on the accuracy of the GPS device.

18 Claims, 4 Drawing Sheets

NEUTRAL ZONES FOR NAVIGATION

BACKGROUND OF THE INVENTION

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

One of the services conventionally provided by TSPs is GPS navigation, which may include the provision of Turn-by-Turn (TBT) directions. To use GPS navigation, a user of the telematics unit may enter a destination, and the GPS component of the telematics unit may provide directions (e.g. through a display and/or through vocal instructions) to the user based on a calculated course from the user's current location to the user's destination. When a user does not follow the directions and goes off-course (i.e., when the position of the vehicle is not on the calculated course), the GPS unit may recalculate a new course for the user to take based on the vehicle's position when it goes off-course.

While this is often a helpful feature for users who accidentally take a wrong turn, miss a turn, or encounter some unanticipated obstacle (e.g. road closures), this course recalculation is often a source of annoyance for users who are intentionally making a deviation from the calculated course but plans to return to the calculated course (e.g. a user stopping at a rest stop). Thus, it is an object in part to provide a system and method for processing GPS navigation such that intentional deviations from a calculated course do not trigger off-course notifications. However, while this is an object underlying certain implementations of the invention, it will be appreciated that the invention is not limited to systems that solve the problems noted herein. Moreover, the inventors have created the above body of information merely for the convenience of the reader; the foregoing is a discussion of problems discovered and/or appreciated by the inventors, and is not an attempt to review or catalog the prior art.

BRIEF SUMMARY OF THE INVENTION

The invention provides a system and method for treatment of certain areas as neutral zones during GPS navigation to avoid unnecessary off-route notifications and route recalculation. In an implementation of the present invention, the method comprises receiving, at a GPS device, input from a user corresponding to an intended destination, calculating a route from a starting point to that destination, determining whether the user has entered a geographic region designated as a neutral zone, and not providing the user with off-route notifications while the user is within the neutral zone. The neutral zone may be defined by a set of GPS coordinates, and the GPS device may determine whether the user is within the neutral zone by comparing the current position of the user to the set of GPS coordinates. The user may also provide an input to the GPS device indicating that the user is entering an area that the user considers to be a neutral zone.

Not providing off-route notifications may be implemented by the GPS device by considering the user to be within the calculated route while the user is within a neutral zone, or by disabling off-route notifications while the user is within the neutral zone. Route recalculation based on determining that the user is off-route may also be disabled while the user is in the neutral zone. The neutral zone may further be polygonal, and the size of the neutral zone may be based on the accuracy of the GPS device. The starting point of the calculated route may be the current position of the user at approximately the time of route calculation.

The method may further be implemented on a tangible non-transient computer-readable medium in a GPS system through corresponding instructions. A database for storing neutral zone information is part of the GPS system, and the GPS device may retrieve neutral zone data from the database. The database may be located at a call center, and neutral zones may be programmed into the database by the call center or by the user.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for treatment of certain areas as neutral zones during GPS navigation to avoid unnecessary off-route notifications and route recalculation. In certain implementations, the GPS navigation may be performed by a GPS unit that is part of a telematics system on a vehicle.

Figure 1:
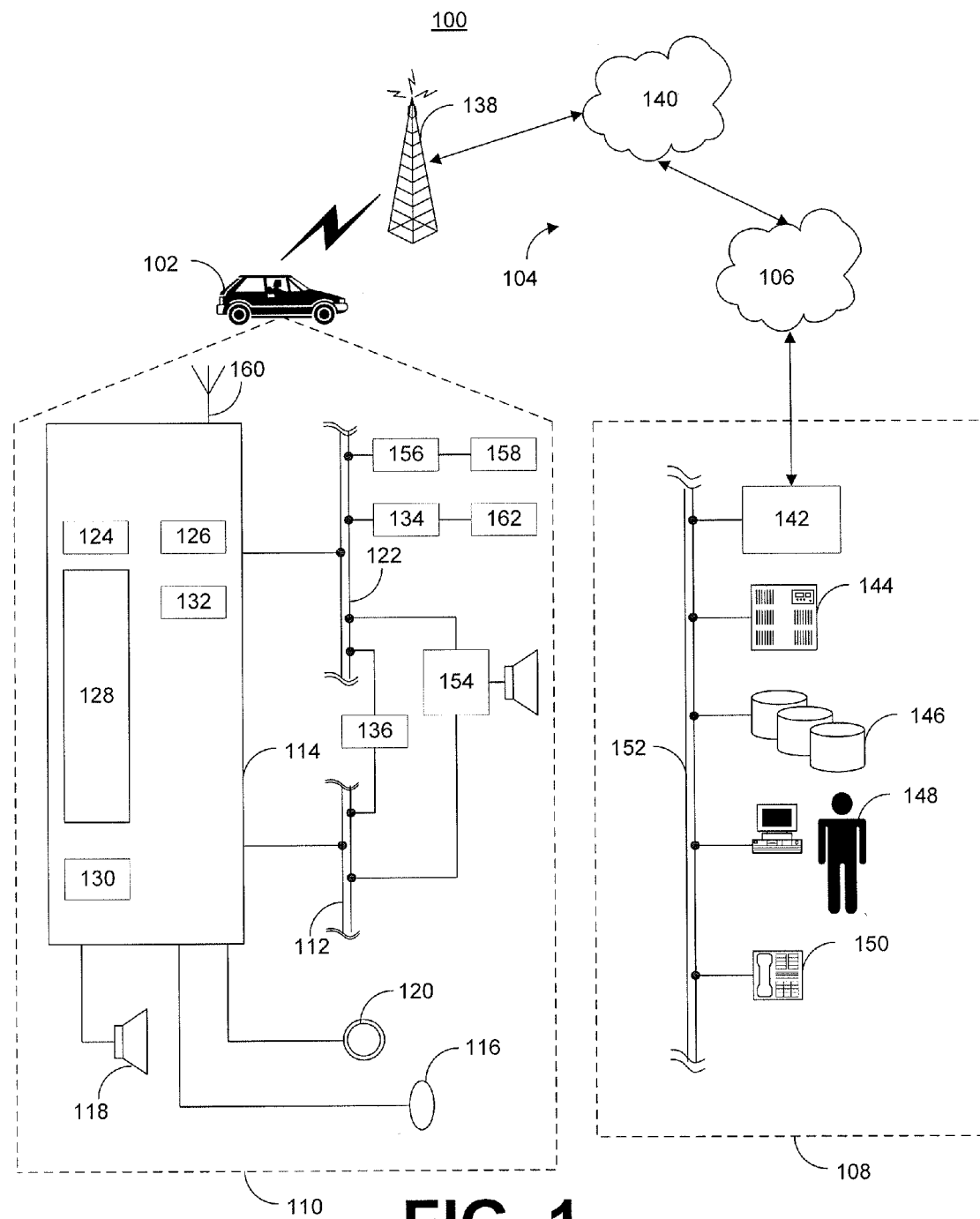
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle.

GPS navigation services may be implemented based on the geographic position information of the vehicle provided by the GPS based chipset/component 132. A user of the telematics unit may enter a destination using inputs corresponding to the GPS component, and a route to a destination may be calculated based on the destination address and a current position of the vehicle determined at approximately the time of route calculation. Turn-by-turn (TBT) directions may further be provided on a display screen corresponding to the GPS component and/or through vocal directions provided through a vehicle audio component 154. It will be appreciated that the calculation-related processing may occur at the telematics unit or may occur at a call center 108.

Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission.

In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech.

The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server.

As appreciated by those skilled in the art, various cell tower/base station/MSC arrangements are possible and could be used with wireless system 104 (also referred to as the "cellular network" herein). For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
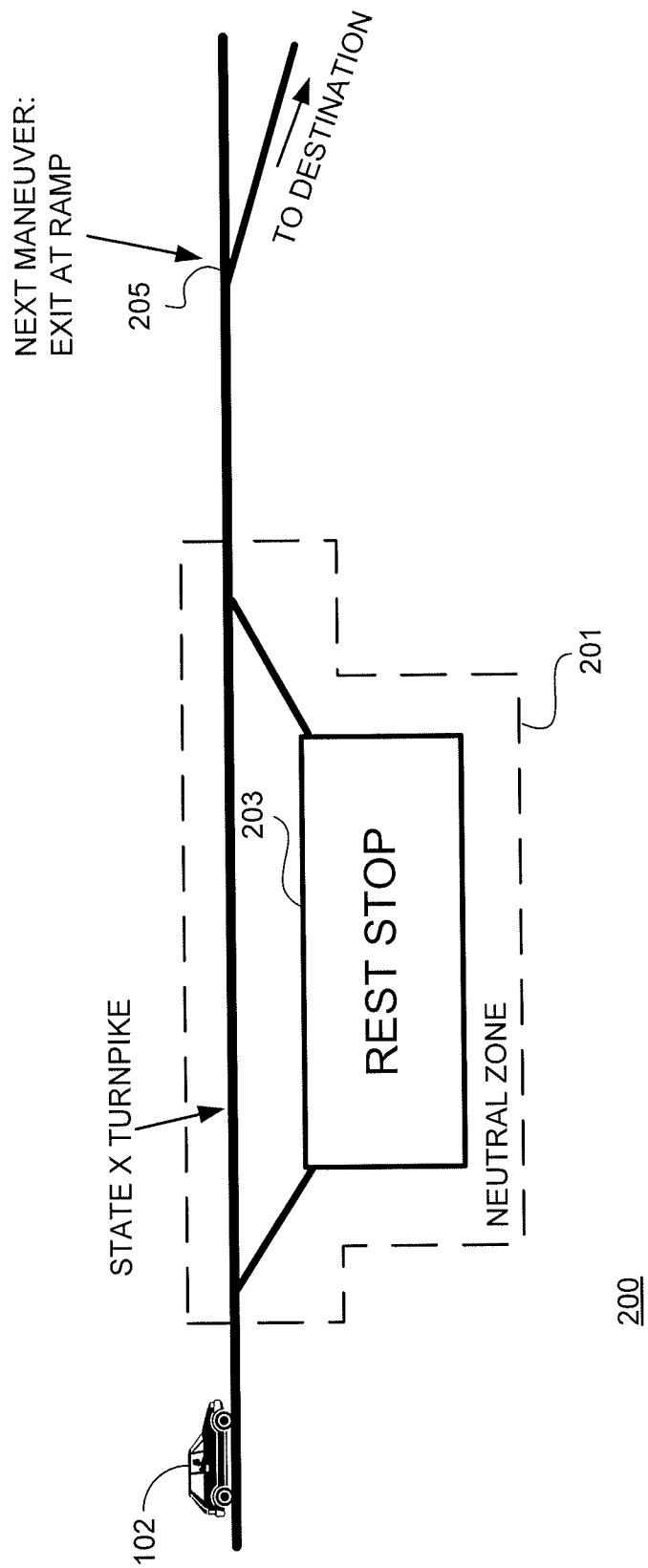
FIG. 2 is a diagram illustrating the designation of a neutral zone on an exemplary map in accordance with an implementation of the described principles.

With further reference to the architecture of FIG. 1, and turning more specifically to FIG. 2, a diagram 200 is depicted illustrating the designation of a neutral zone 201 on a simplified exemplary map. In this example, a vehicle 102 is currently traveling on the State X Turnpike headed towards a destination entered into the GPS unit by the user. The calculated route provided to the user informs the user that the next maneuver (i.e., the next "turn" in the provision of TBT directions) is to exit at a ramp 205. It will be appreciated that TBT directions is merely a type of GPS navigation, and because the principles described herein are applicable to GPS navigation, they are equally applicable to GPS navigation through TBT directions. It will also be appreciated that the processing associated with GPS navigation/TBT directions may be carried out at a vehicle through a telematics unit, at a TSP call center, or both (e.g. the intelligence for route calculation may be implemented locally at the GPS unit of the vehicle, or may be implemented at the call center and provided wirelessly to the vehicle).

In a conventional system, if the user were to decide to take a break and stop at rest stop 203, the GPS system may determine that the user is going "off-route" and may inform the user that it is going off-route and attempt to recalculate a route to the destination. However, in this implementation, the area surrounding the rest stop 203 has been designated a "neutral zone" 201 wherein off-route notifications and route recalculation are disabled. Thus, the GPS unit will continue to display, and the TBT directions will continue to indicate, that the next maneuver is to exit at ramp 205. In one implementation, the neutral zone 201 may be a polygonal area represented by a set of GPS coordinates stored at a database at the telematics unit of vehicle 102 or at a call center 108.

In a further implementation, the designation of a neutral zone may depend on the calculated route. For example, if a user is traveling from State X to State Y along a highway, the area surrounding many of the exits where vehicles travelling on that highway often stop for gas, food, or lodging may all be designated as neutral zones for the purposes of that calculated route from State X to State Y. However, if a user is travelling locally from a point A to point B within State X along one of those exits, that area may not be a neutral zone because the user's calculated route does not encompass the aforementioned stretch of highway. Thus, an area that may be considered a neutral zone for one route may not be a neutral zone for a different route. In yet another further implementation, the size of the neutral zone may be varied based on the accuracy of the GPS position of the vehicle provided by the GPS unit.

Figure 3:
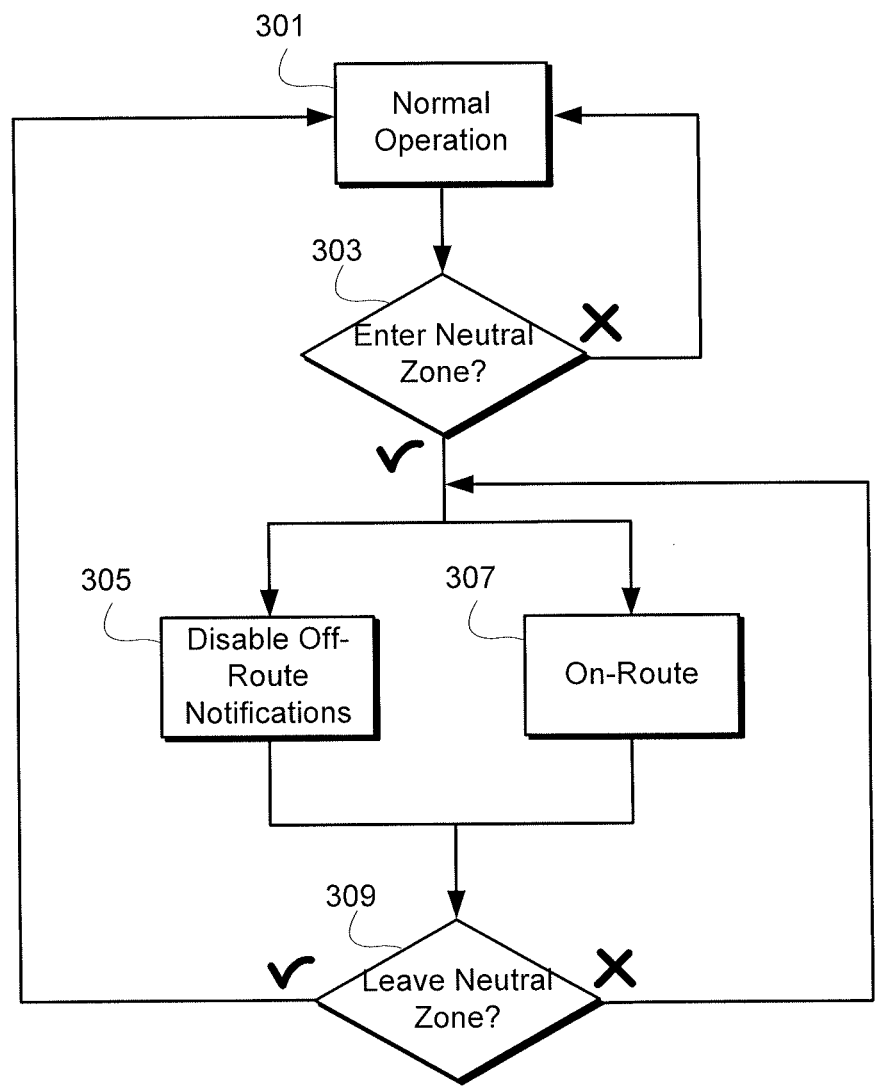
FIG. 3 is a flowchart illustrating a process for GPS navigation through a neutral zone in accordance with an implementation of the described principles.

With further reference to the architecture of FIG. 1 and the exemplary map of FIG. 2, a process 300 for GPS navigation and TBT directions through the neutral zone 201 is depicted by FIG. 3. The user in vehicle 102 driving on State Turnpike X is being provided directions normally 301 by the GPS unit of the telematics unit until the telematics unit (or call center) determines, through the vehicle's GPS unit, that the vehicle has entered a neutral zone 303. It will be appreciated that neutral zones may be pre-marked with the map information from a map database used by the GPS unit to provide directions to the user or may be separately retrieved by the GPS unit (e.g. from a separate neutral zone database) to determine whether there are neutral zones along the user's calculated route.

While the vehicle 102 is within the neutral zone, the telematics unit (or call center) may disable off-route notifications and route recalculation 305. In an alternative implementation, the telematics unit (or call center) may simply designate the entire neutral zone as being "on-route" 307, and thus, any movement of the vehicle 102 within the neutral zone will not trigger off-route notifications or route recalculation. When the vehicle leaves the neutral zone 309, the GPS navigation and TBT directions may resume normal operation 301, providing off-route notifications and route recalculation when the user deviates from the calculated route. It will be appreciated that, while the user is within the neutral zone, the display in the vehicle corresponding to the GPS unit may continue to display the current location of the vehicle and continue to indicate information such as distance to the next maneuver. TBT directions may also continue to indicate the same next maneuver to the user.

Figure 4:
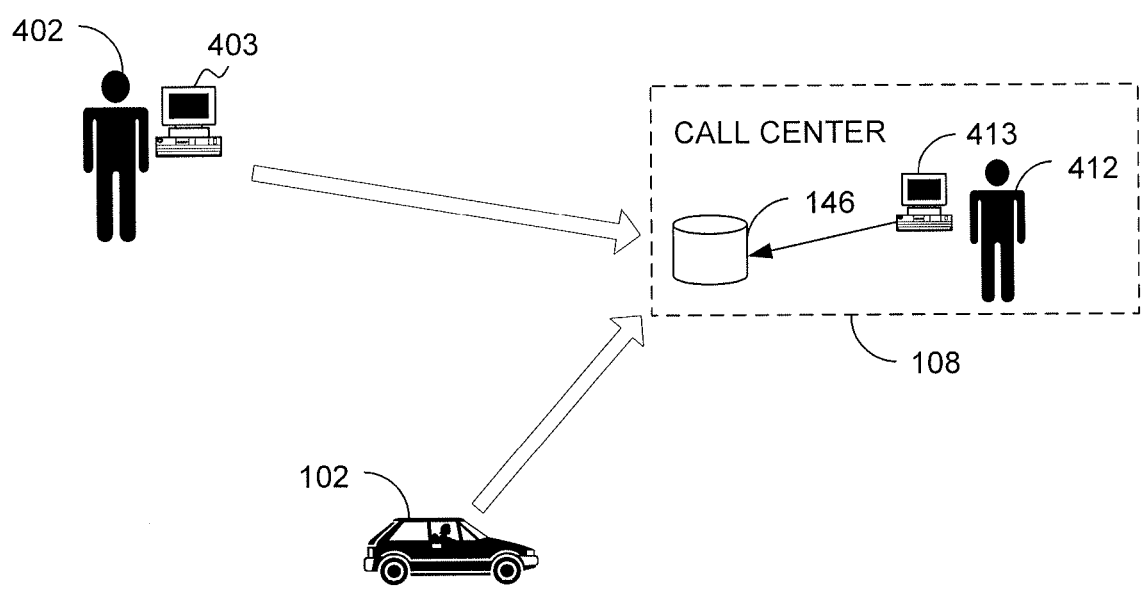
FIG. 4 is a diagram illustrating processes for storing neutral zones in a database in accordance with an implementation of the described principles.

Turning now to FIG. 4, a diagram 400 is depicted illustrating different ways through which neutral zones may be stored in a database. In one implementation, the database 146 is at a call center 108, and neutral zone information (e.g., sets of GPS coordinates corresponding to neutral zones) is programmed into the database 146 through a computer 413 by a person 412 associated with the call center according to neutral zone designations by the call center. It will be appreciated that person 412 and computer 413 need not physically be at the call center 108.

A user 402 may further manually program neutral zones into the database 146 through a computer 403 or other computing device (e.g. mobile phone) through a program, website, or other application suitable for communicating neutral zone information to database 146. For example, a user may often travel certain routes and may regularly deviate from the routes at certain locations, and it may be desirable for the user to manually designate certain areas as neutral zones. In another implementation, a user may program neutral zones directly into the database 146 when the user is in the vehicle 102. For example, if the user in vehicle 102 is stopping at a rest stop that is not already stored in the database 146 as a neutral zone, the user may provide an input to the telematics unit (e.g. through pressing a button) that indicates to the GPS navigation/TBT directions unit that the user is entering a neutral zone (e.g., corresponding to 303 in FIG. 3). The user can then press another button when the user leaves the neutral zone to indicate that the user has left the neutral zone (e.g., corresponding to 309 in FIG. 3), and the GPS unit will resume normal operation (301 in FIG. 3). In a further implementation, the telematics unit or GPS/TBT unit may give the user the option to store the neutral zone traversed by the user at database 146 such that in the future, the GPS/TBT unit will automatically recognize the area as a neutral zone when the vehicle enters the area. It will further be appreciated that the database 146 may also be implemented locally at the vehicle telematics unit instead of remotely at the call center 108.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center. It will further be appreciated that, although the above implementations have been described in the context of a telematics unit and vehicles, the principles described herein are not limited to telematics units or vehicles and may also be implemented on standalone GPS devices and other types of GPS navigation units (such as those provided on mobile phones).

It will thus be appreciated that the described system and method allows for treatment of certain areas as neutral zones during GPS navigation to avoid unnecessary off-route notifications and route recalculation. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for satellite-based navigation using a satellite-based navigation device having a processor, comprising:
    receiving, at the device, input from a user corresponding to an intended destination;
    calculating, using the device, a set of navigation instructions constituting a defined route from a starting point to the intended destination;
    determining, using the device, after the calculating, that the user has entered a neutral zone geographic region at an intermediate position along the defined route, wherein the neutral zone geographic region includes a portion of the defined route and one or more vehicle stopping locations proximate to the portion of the defined route and does not include beginning and end points of the defined route, wherein the one or more vehicle stopping locations corresponds to at least one of the group consisting of: a rest stop, a gas station, a restaurant, and lodging; and
    suppressing, at the device, route recalculation while the vehicle remains in the neutral zone geographic region;
    wherein neutral zone geographic regions are defined based on defined routes such that it is possible for a part of a roadway that is included within a neutral zone geographic region of a first defined route to not be included within any neutral zone geographic region of a second defined route.

2. The method of claim 1, wherein the neutral zone geographic region is defined by a set of Global Positioning System (GPS) coordinates.

3. The method of claim 1, wherein the neutral zone geographic region is polygonal.

4. The method of claim 2, wherein the determining comprises:
    comparing GPS information corresponding to the current position of the user with the set of GPS coordinates defining the neutral zone geographic region.

5. The method of claim 1, wherein the determining comprises:
    receiving an input from the user that the user is entering a geographic region that the user considers a neutral zone.

6. The method of claim 1, wherein the size of the neutral zone geographic region is based on an accuracy value associated with the device.

7. The method of claim 1, wherein the starting point is a current position of the user determined at approximately the time of route calculation.

8. The method of claim 1, wherein information regarding neutral zone geographic regions is stored at a database.

9. A system for satellite-based navigation, comprising a tangible, non-transient computer-readable medium having thereon computer executable instructions, the computer executable instructions comprising instructions for:

calculating a defined route from a starting point to the intended destination based on a received input from a user corresponding to an intended destination;

determining, after the calculating, that the user has entered a neutral zone geographic region at an intermediate position along the defined route, wherein the neutral zone geographic region includes a portion of the defined route and one or more vehicle stopping locations proximate to the portion of the defined route and does not include beginning and end points of the defined route, wherein the one or more vehicle stopping locations corresponds to at least one of the group consisting of: a rest stop, a gas station, a restaurant, and lodging; and suppressing route recalculation while the vehicle remains in the neutral zone geographic region;

wherein neutral zone geographic regions are defined based on defined routes such that it is possible for a part of a roadway that is included within a neutral zone geographic region of a first defined route to not be included within any neutral zone geographic region of a second defined route.

10. The system of claim 9, further comprising a database for storing neutral zone information, wherein the computer executable instructions further comprise:

instructions for retrieving neutral zone information from the database to be used in the determining.

11. The system of claim 10, wherein the database for storing neutral zone information is located at a call center.

12. The system of claim 10, wherein the neutral zone information is programmed into the database based on neutral zone information provided by a call center.

13. The system of claim 10, wherein the neutral zone information is programmed into the database based on neutral zone information provided by the user.

14. The system of claim 9, wherein the instructions for the determining further comprise:

instructions for receiving an input from the user that the user is entering a geographic region that the user considers a neutral zone.

15. The method of claim 5, further comprising determining that the user has exited the neutral zone geographic region;

wherein determining that the user has exited the neutral zone geographic region comprises receiving an input from the user that the user is exiting the geographic region that the user considers a neutral zone.

16. The system of claim 13, wherein the neutral zone information is provided by the user sending a signal to indicate entry into the neutral zone geographic region and the user subsequently sending a signal to indicate departure from the neutral zone geographic region.

17. The method of claim 1, wherein the portion of the defined route included in the neutral zone geographic region is part of a highway, and the one or more vehicle stopping locations is accessible by a vehicle from the highway.

18. The system of claim 9, wherein the portion of the defined route included in the neutral zone geographic region is part of a highway, and the one or more vehicle stopping locations is accessible by a vehicle from the highway.

* * * * *